United States Patent
Fukuda et al.

(10) Patent No.: US 8,211,297 B2
(45) Date of Patent: Jul. 3, 2012

(54) SOLID-LIQUID SEPARATOR

(75) Inventors: Mii Fukuda, Tokyo (JP); Takashi Menju, Kawasaki (JP); Yasushi Yamamoto, Yokohama (JP); Kazuyoshi Aoki, Yokohama (JP); Takeshi Matsushiro, Yokohama (JP); Ryoichi Arimura, Musashino (JP); Norimitsu Abe, Kawasaki (JP); Futoshi Kurokawa, Tachikawa (JP); Atsushi Yukawa, Tokyo (JP); Tokusuke Hayami, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 395 days.

(21) Appl. No.: 12/542,571

(22) Filed: Aug. 17, 2009

(65) Prior Publication Data
US 2010/0044285 A1 Feb. 25, 2010

(30) Foreign Application Priority Data
Aug. 22, 2008 (JP) .............................. P2008-214267

(51) Int. Cl.
B01D 17/038 (2006.01)
(52) U.S. Cl. .... 210/96.2; 210/202; 210/259; 210/512.1; 210/513; 210/709
(58) Field of Classification Search ............... 210/96.1, 210/101, 198.1, 205, 206, 194, 195.1, 259, 210/512.1, 709, 711, 739, 788, 202, 203, 210/512.2, 513
See application file for complete search history.

(56) References Cited

U.S. PATENT DOCUMENTS

| 4,274,968 | A | * | 6/1981 | Grutsch et al. ................ 210/666 |
| 4,345,996 | A | * | 8/1982 | Lindman et al. ............. 210/96.1 |
| 4,482,459 | A | * | 11/1984 | Shiver ........................... 210/639 |
| 4,587,024 | A | * | 5/1986 | Hayatdavoudi ............... 210/739 |
| 5,202,016 | A | * | 4/1993 | Church et al. ................. 210/85 |
| 6,638,421 | B2 | * | 10/2003 | Murayama et al. .......... 210/96.1 |
| 6,797,181 | B2 | * | 9/2004 | Morse et al. .................. 210/745 |

FOREIGN PATENT DOCUMENTS
JP 60-187310 9/1985
JP 2000-279947 10/2000
(Continued)

OTHER PUBLICATIONS

Notice of Reasons for Refusal issued by the Japanese Patent Office on Jun. 1, 2010, for Japanese Patent Application No. 2008-214267, and English-language translation thereof, author unknown.

(Continued)

Primary Examiner — Joseph Drodge
(74) Attorney, Agent, or Firm — Finnegan, Henderson, Farabow, Garrett & Dunner, L.L.P.

(57) ABSTRACT

An activated carbon adder adds activated carbon to raw water before flocculating sedimentation, to adsorb suspended matter contained in raw water, a liquid cyclone is adapted to separate activated carbon with suspended matter adsorbed thereon, from raw water containing activated carbon, an inflow line is connected with the liquid cyclone so as to cause raw water containing activated carbon before flocculating sedimentation to flow into the liquid cyclone and swirl therein, an activated carbon discharge line discharges activated carbon spun down out of raw water containing activated carbon in the liquid cyclone, from the liquid cyclone, and a pretreated water discharge line discharges raw water having got rid of activated carbon as pretreated water from the liquid cyclone, allowing for a reduced amount of chemicals to be used, with production of a reduced amount of sludge.

7 Claims, 14 Drawing Sheets

FOREIGN PATENT DOCUMENTS

| | | |
|---|---|---|
| JP | 2002-166265 | 6/2002 |
| JP | 2005-013892 | 1/2005 |
| JP | 2006-102620 | 4/2006 |

OTHER PUBLICATIONS

First Office Action issued by the State Intellectual Property Office of the People's Republic of China on Apr. 27, 2011, for Chinese Patent Application No. 200910166704.5, and English-language translation thereof, unknown author.

Second Office Action issued by the Chinese Patent Office on Feb. 22, 2012, for Chinese Patent Application No. 200910166704.5, and English-language translation of text thereof.

Official Action Letter issued on Dec. 16, 2011, by the Indonesian Patent Office in counterpart Indonesian Application No. P00200900440 (2 pages).

* cited by examiner

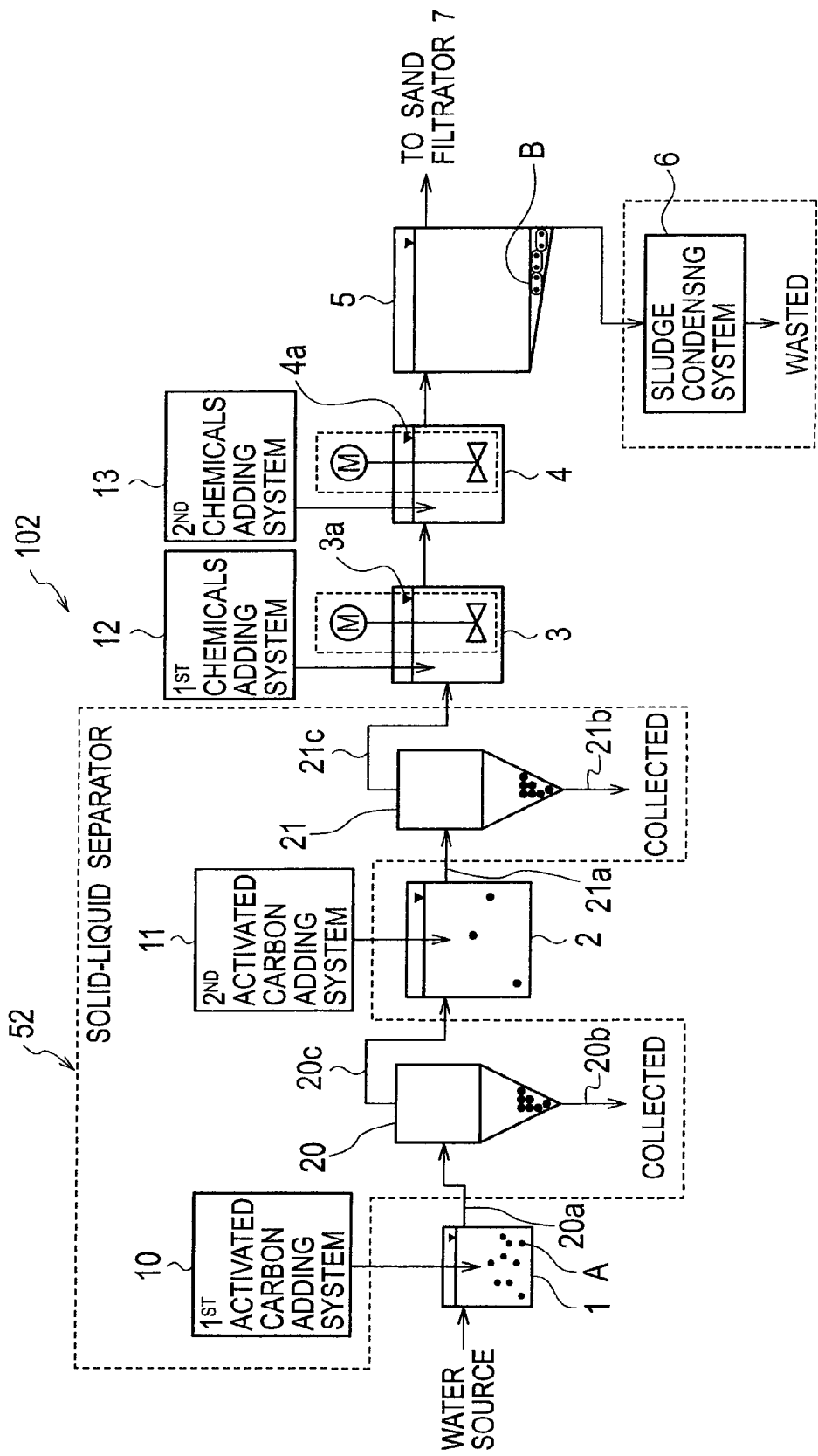

SOLID-LIQUID SEPARATOR

CROSS REFERENCE TO RELATED APPLICATIONS

The present application claims the benefit of priority under 35 U.S.C. §119 to Japanese Patent Application No. 2008-214267, filed on Aug. 22, 2008, the entire contents of which are incorporated herein by reference.

BACKGROUND OF THE INVENTION

1. Field of Art

The present invention relates to a solid-liquid separator making use of activated carbon for separation of suspended matter in raw water in a water treatment process in a water purification plant.

2. Description of Relevant Art

Water purification plants employ various methods for water treatment in accordance with raw water as a treatment target. For some treatments of water containing, for instance, causative substances of foreign odor or taste (2-MIB, diosmin, etc), anion surfactants, phenols, trihalomethane or its precursor, volatile organochlorine compounds (trichloroethylene, etc), trace toxics (pesticides, etc) or the like, there has been use of activated carbon for adsorption of such substances.

FIG. 1 illustrates a water treatment system 100 for water purification plants as a general example making use of activated carbon. Raw water is drawn from a water source such as a river, and collected in a water intake well 1 near the water source. Raw water in the intake well 1 is transported to a water reservoir well 2 provided for temporary storage of incoming water, and is sent from there to a fast agitation basin 3.

The water treatment system 100 includes a facility 10 for adding activated carbon A to the intake well 1, as 'a first activated carbon adding system', and another facility 20 for adding activated carbon A to the reservoir well 2, as 'a second activated carbon adding system'. Added activated carbon in the intake well 1, as well as that in the reservoir well 2, adsorbs thereon suspended matter in raw water. It is noted that the water treatment system 100 in FIG. 1 has two activated carbon adding systems being the first activated carbon adding system 10 for addition of activated carbon A to the intake well 1 and the second activated carbon adding system 20 for addition of activated carbon A to the reservoir well 2, and may simply have either the first activated carbon adding system 10 or the second activated carbon adding system 20.

There is a facility 12 for adding chemicals (i.e., flocculant) to the fast agitation basin 3, which is referred herein to 'a first chemicals adding system'. The fast agitation basin 3 includes a first agitator 3a, which agitates raw water containing activated carbon A and flocculant, so that floc B is formed by an effect of flocculant. Raw water agitated in the fast agitation basin 3 is sent to a flocculation basin 4.

There is a facility 13 for adding chemicals (i.e., flocculation additive) to the flocculation basin 4, which is referred herein to 'a second chemicals adding system'. The flocculation basin 4 includes a second agitator 4a, which agitates raw water by a slower speed than the first agitator 3a, so that floc B is grown larger by an effect of flocculation additive. Raw water agitated in the flocculation basin 4 and containing floc B is sent to a flocculating sedimentation basin 5.

At the flocculating sedimentation basin 5, sludge is settled out for separation with floc B inclusive, and dehydrated for condensation by a sludge condensing system 6, to dispose of as an industrial waste. As sludge is removed with floc B inclusive, resultant water is sent through a sand separator 7 for sand filtration and a chlorinator 8 for a chlorination process, to a distribution reservoir 9, where it is distributed to water stations.

The example in FIG. 1 is illustrated to add activated carbon to the intake well 1 and the reservoir well 2. There are two types of activated carbon for use in purification plants, being 'granular activated carbon' within a range of approximately 150 μm or more in particle size and 'powdery activated carbon' within a range under approximately 150 μm in particle size, having their applications different from each other as well as particle sizes.

Generally, 'granular activated carbon' is applied to a subsequent stage of sand filtration, and used for collection of organic compounds, and coloring components of low molecular weights in a molecular weight range under approximately 1500 that have not been removed by flocculating sedimentation.

Granular activated carbon undergoes development of a breakthrough (as an equilibrant between adsorption rate and desorption rate balanced with each other failing to work for adsorption) along with adsorption of organic compounds. The development of breakthrough has an increased rate, in particular with adsorption of organochlorine compounds. Granular activated carbon thus has a reduced adsorption capacity in due course. However, there are treatments available for regeneration of adsorption capacity. Although available treatments for regeneration of adsorption capacity need a dedicated contact basin, water treatment processes may well have such a regeneration treatment incorporated therein to implement an efficient recycling in a long-term use of activated carbon.

As an available method for regeneration of adsorption capacity of activated carbon, there is a 'water vapor activation method' using water vapor at hot temperatures about 900° C. for the activation, and a 'chemicals activation method' using chemicals such as zinc chloride or sulfuric acid for a woody material to be dipped therein before carbonization. The chemicals activation method may cause an elution of chemicals or heavy metals such as zinc into water under treatment, and it generally is unused for activation of carbon for water purification, giving place to the water vapor activation method.

On the other hand, in general, 'powdery activated carbon' is added in processes before flocculating sedimentation such as of drawn water or incoming water, as illustrated in FIG. 1, for use to adsorb and remove suspended matter, against a temporary declination in quality of taken water, such as generation of odor in drought period or summer season, or overgrowth of phytoplankton called algal bloom. This is because incorporation of suspended matter such as algae into flock would makes this lighter in specific gravity, prone to breakage, and debased in sedimentation property, needing a great deal of flocculant to be input with an increased cost for chemicals, and declination in quality of taken water should be coped with by use of activated carbon for removal of suspended matter in processes before flocculating sedimentation, allowing for an enhanced performance with a decreased running cost on flocculant.

Instead, if powdery activated carbon is input, there might be increased quantities of flocculant and flocculation additive added with an increased cost for chemicals, as well as with an increased rate in production of sludge constituting difficulties in treatments for disposal and collection. In addition, powdery activated carbon is very small in particle size, which constitutes a bar to a treatment for regeneration of adsorption capacity. Accordingly, powdery activated carbon is employed typically as a countermeasure, not for regular use, but for temporary irregular use.

Besides the use of traditional sedimentation for coagulate settling methods, there is a use of centrifugal force for liquid cyclones as a solid-liquid separator employable in water purification. Liquid cyclones are adapted to make use of centrifugal forces produced by swirling momentum of incoming liquid, for solid-liquid separation due to a difference in specific gravity between solid and liquid. Accordingly, liquid cyclones have a motion-less structure that can be implemented by a simple configuration with an enhanced performance per occupied floor area, as an advantage.

As one of techniques employing a liquid cyclone and activated carbon in combination for treatments in water purification, there is a technique disclosed in Japanese Patent Application Laid-Open Publication No. 2005-13892 (referred herein to JP 2005-13892 A), which included a process of regenerating used granular activated carbon to re-input to, among others, a fast agitation tank and a mixing tank. In the technique disclosed in JP 2005-13892 A, granular activated carbon was regenerated to adsorb suspended matter, and provide a promoter effect to promote floc settling with an increased floc settling rate. Regeneration of activated carbon was followed by reuse, with a resultant reduction in waste amount of activated carbon.

However, in the technique disclosed in JP 2005-13892 A, granular activated carbon was input in a treatment process before flocculating sedimentation, so that flocculant was added to raw water containing granular activated carbon, resulting in an increased amount of chemicals such as flocculant required for flocculating sedimentation, as an issue. Further, in the technique disclosed in JP 2005-13892 A, granular activated carbon was contained in floc settled in a sedimentation basin, as part thereof to be wasted together with the rest, resulting in production of a plenty of sludge difficult to waste, as an issue.

In view of the foregoing issues, the present invention provides a solid-liquid separator allowing for a reduced amount of chemicals to be used, with production of a reduced amount of sludge.

SUMMARY OF THE INVENTION

According to as aspect of the present invention, a solid-liquid separator comprises an activated carbon adder configured to add activated carbon to raw water before flocculating sedimentation, to adsorb suspended matter contained in raw water, a liquid cyclone adapted to separate activated carbon with suspended matter adsorbed thereon, from raw water containing activated carbon, an inflow line configured for connection thereof with the liquid cyclone to cause raw water containing activated carbon before flocculating sedimentation to flow into the liquid cyclone and swirl therein, an activated carbon discharge line configured to discharge activated carbon spun down out of raw water containing activated carbon in the liquid cyclone, from the liquid cyclone, and a pretreated water discharge line configured to discharge raw water having got rid of activated carbon as pretreated water from the liquid cyclone.

BRIEF DESCRIPTION OF THE DRAWINGS

FIG. 4 is an explanatory flow diagram of a water treatment system including a solid-liquid separator according to a second embodiment of the present invention.

DETAILED DESCRIPTION OF THE EMBODIMENTS

Figure 1:
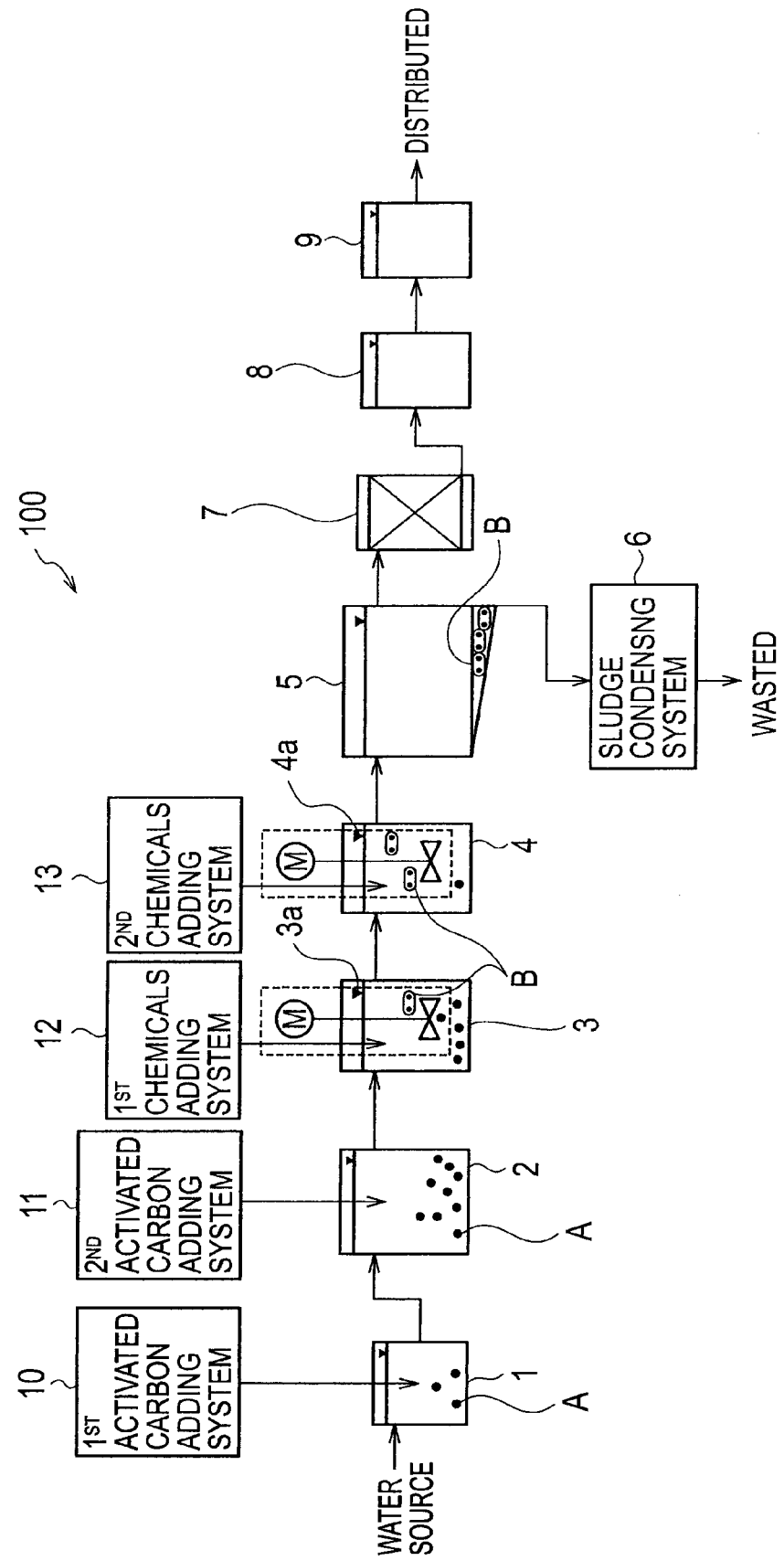
FIG. 1 is an explanatory flow diagram of a general example of water treatment system.

There will be described water treatment systems including solid-liquid separators according to embodiments of the present invention, with reference to associated drawings. In the embodiments, like elements are designated by like reference characters in drawings, to omit redundancy. In regard of the general example in FIG. 1, as well, like elements are designated by like reference characters.

(First Embodiment)

Figure 2:
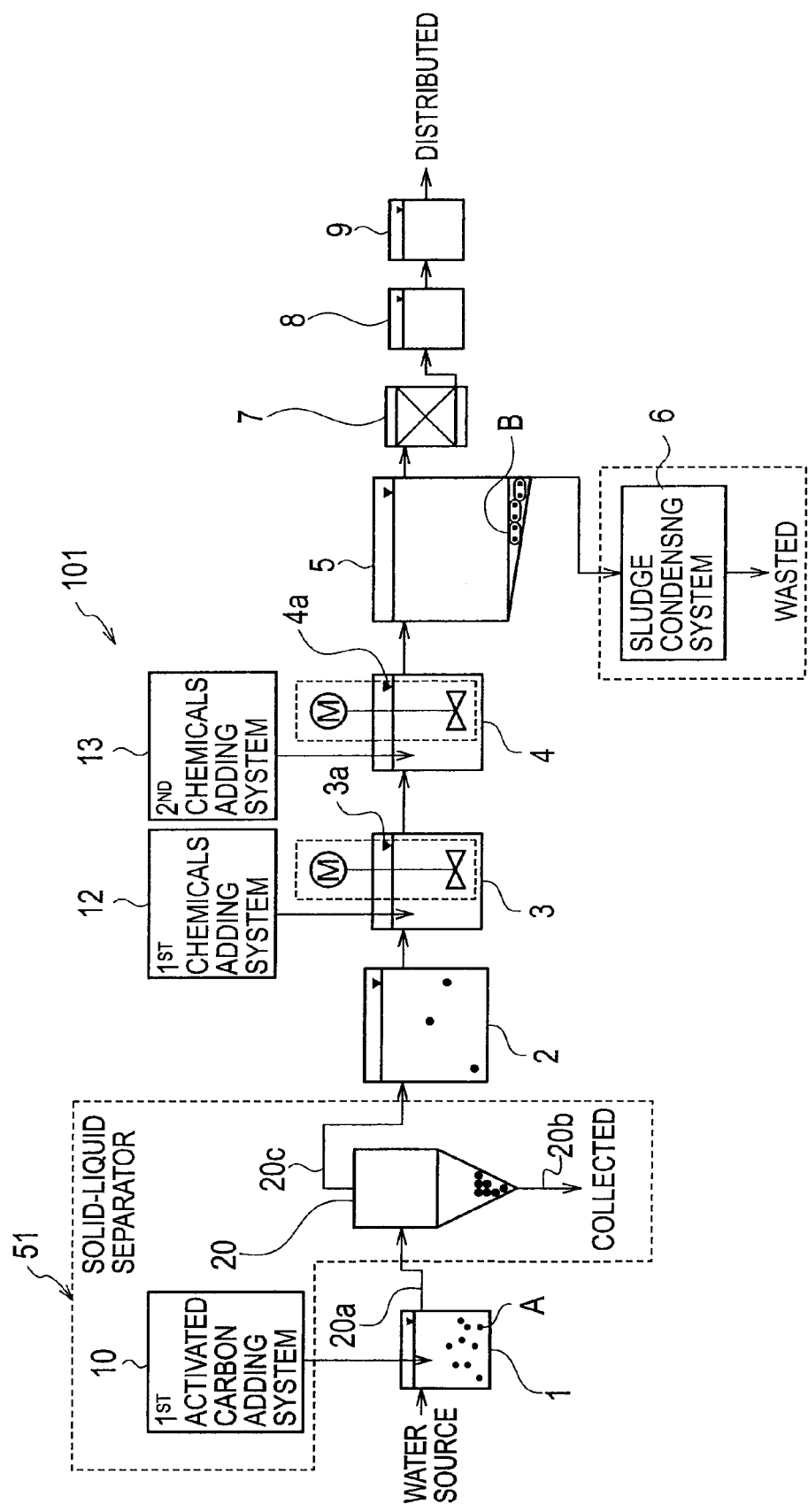
FIG. 2 is an explanatory flow diagram of a water treatment system including a solid-liquid separator according to a first embodiment of the present invention.

Description is now made of a water treatment system 101 including a solid-liquid separator 51 according to a first embodiment of the present invention, with reference to FIG. 2. In the first embodiment, the solid-liquid separator 51 is configured with: an activated carbon adding system 10 for adding activated carbon A to raw water as a target to be treated; and a liquid cyclone 20 for separating activated carbon A from raw water, together with suspended substances in raw water as they are adsorbed thereon.

As illustrated in FIG. 2, the water treatment system 101 includes: besides the solid-liquid separator 51 configured with the activated carbon adding system 10 and the liquid cyclone 20; a water intake well 1, in which raw water drawn from a water source such as a river is stored, and activated carbon A is added; a water reservoir well 2, to which raw water having got rid of activated carbon A by separation is supplied from the liquid cyclone 20; a fast agitation basin 3, which is supplied with raw water from the reservoir well 2; a first chemicals adding system 12, which adds a flocculant to the fast agitation basin 3; a first agitator 3a, which agitates raw water in the fast agitation basin 3, for generation of floc B therein; a flocculation basin 4, which is supplied with raw water from the fast agitation basin 3; a second chemicals adding system 13, which adds a flocculation additive to the flocculation basin 4; a second agitator 4a, which agitates raw water in the flocculation basin 4, for growth of floc B therein; a flocculating sedimentation basin 5, which is supplied with raw water from the flocculation basin 4, and configured for a flocculating sedimentation treatment; and a sludge condensing system 6, which collects settled floc B in the flocculating sedimentation basin 5. Further, like the other embodiments, the water treatment system 101 according to the first embodiment includes: a sand separator 7, where treated water as having got rid of floc B by sedimentation in the flocculating sedimentation basin 5 is sent for sand filtration; a chlorinator 8, where treated water as sand-filtrated is chlorinated; and a distribution reservoir 9, where treated water as chlorinated is sent for temporary storage, and distributed to associated water stations.

The activated carbon adding system 10 adds activated carbon A to the intake well 1 in which raw water taken from a water source is drawn for temporary storage. In the intake well 1, added activated carbon A adsorbs thereon foreign odor and taste components, minute amounts of toxic substances, and the like contained in raw water. Raw water containing activated carbon A is sent from the intake well 1 to the liquid cyclone 20.

Activated carbon used may be, for instance, woody activated carbon such as of palm hull, wood chip, or sawdust, or coal activated carbon such as of peat. For use concerned, although desirable is granular activated carbon, essential to activated carbon is the range of particle diameters to be separable from raw water in the liquid cyclone 20, there being a room for use of powdery activated carbon subject to relatively large particle diameters. Activated carbon may well be sorted by use of a sieve shaker or elutriator.

Figure 3A:
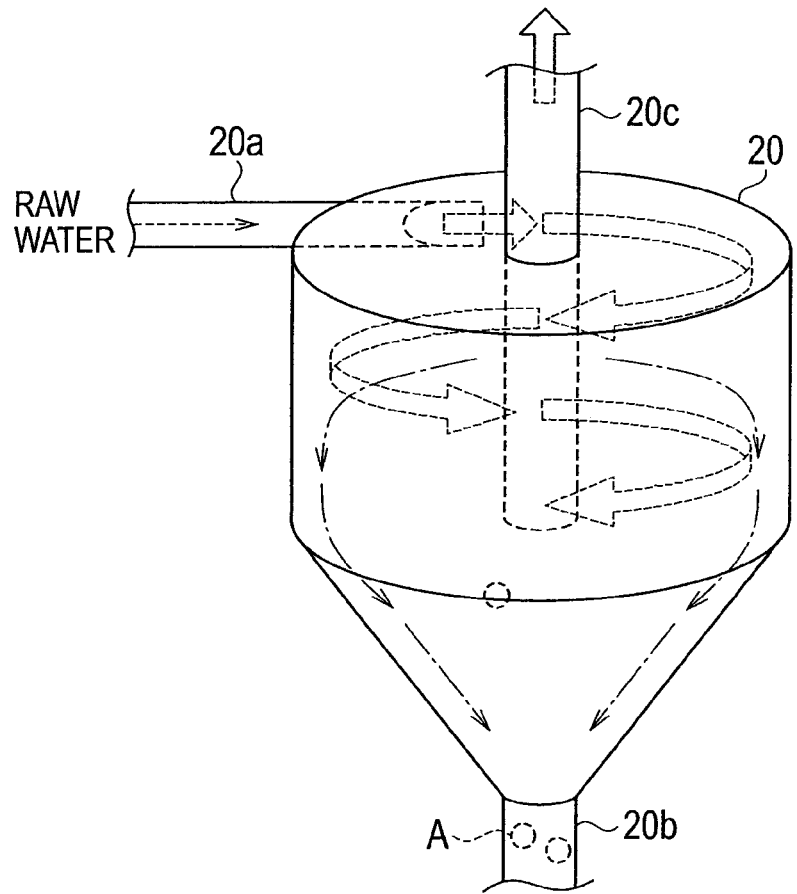
FIG. 3A is a perspective view of a liquid cyclone of the water treatment system of FIG. 2, and FIG. 3B, a cross sectional view of the same.
Figure 3B:
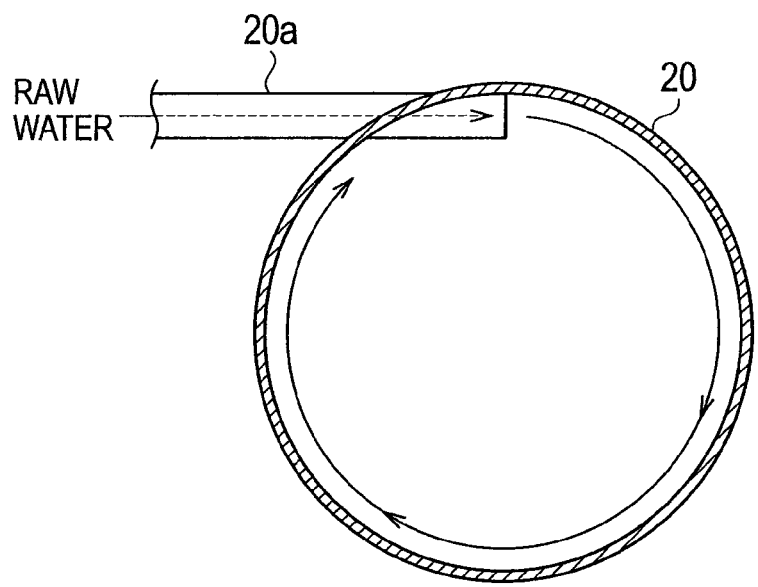

As illustrated in FIGS. 3A and 3B, the liquid cyclone 20 is formed in a general cyclone shape with a cylindrical drum, of which a top portion has an inflow pipe 20a as a connection end of an inflow line tangentially inserted inside a wall thereof, so that incoming liquid is swirled collision-free along the wall inside. For the liquid cyclone 20, incoming from the intake well 1 is raw water containing activated carbon, of which swirling streams have centrifugal forces acting thereon, whereby particles of activated carbon A different in specific gravity from raw water are settled out thereof, being forced to spin down along the wall, so that activated carbon A is separated from raw water. Activated carbon A as spun down is discharged through a connection end of a discharge line, i.e., an activated carbon discharge pipe 20b opening at a converged lower end of a cone portion as lower part of the liquid cyclone 20. Raw water as having got rid of activated carbon A is sent to the reservoir well 2, through a proximal end of an outflow line, i.e., a pretreated water outflow, outlet, or discharge pipe 20c extending along an axis of the drum portion as upper part of the liquid cyclone 20. Activated carbon A is not always wholly separated at the liquid cyclone 20, and residue thereof may be contained in raw water to be sent to the reservoir well 2. Activated carbon A discharged through the activated carbon discharge pipe 20b may be disposed of to waste, or regenerated to recycle.

Raw water from the liquid cyclone 20 is supplied to the reservoir well 2 for temporary storage, and sent from there to the fast agitation basin 3.

At the fast agitation basin 3, raw water supplied from the reservoir well 2 is agitated by the first agitator 3a, together with a flocculant added by the first chemicals adding system 12, whereby activated carbon A left unseparated at the liquid cyclone 20 and suspended substances in raw water are aggregated, and flocculated. And, raw water containing floc B is sent from the fast agitation basin 3 to the flocculation basin 4. Water quality of taken water may vary, deviating from a pH range for flocculation of the flocculant. In this case, pH is adjusted as necessary, by adding chemicals such as an acid or alkali from the first chemicals adding system 12.

At the flocculation basin 4, raw water supplied from the fast agitation basin 3 and containing floc B is agitated by the second agitator 4a, together with a flocculation additive added by the second chemicals adding system 13, whereby floc B in raw water is grown large. Preferably, the second agitator 4a should agitate raw water in the flocculation basin 4, by smaller agitation forces than the first agitator 3a. Then, raw water containing large-grown floc B is sent from the flocculation basin 4 to the flocculating sedimentation basin 5.

The above-noted embodiment has the first chemicals adding system 12 configured to add a flocculant to the fast agitation basin 3, and the second chemicals adding system 13 configured to add a flocculation additive to the flocculation basin 4. However, in some cases, conforming floc B can be produced without addition of flocculation additive, so the second chemicals adding system 13 may be eliminated. In other words, flocculation additives serve for linking floc pieces by the cross-linking effect of high molecules to form enlarged irrefrangible pieces of floc B, and raw water can do simply with addition of a flocculant, so far as large pieces of floc B are formed simply therewith. On the other hand, the effect of flocculation may be reduced with low water temperatures in winter season, calling for use of flocculation additive in some cases. Flocculant or flocculation additive used may be, for instance, an inorganic flocculant, inorganic polymer flocculant, or organic polymer flocculant.

In the aggregate sedimentation basin 5, floc B is settled out under gravity. Settled floc B is discharged from the flocculating sedimentation basin 5 to the sludge condensing system 6, and raw water having got rid of floc B is sent to the sand separator 7. The flocculating sedimentation basin 5 has an inclined plate at the bottom, allowing for an increased settling rate of floc B.

In the sludge condensing system 6, settled floc B in the flocculating sedimentation basin 5 is collected as sludge, and dehydrated to condense. Condensed sludge is disposed of as an industrial waste.

Raw water sent from the flocculating sedimentation basin 5 is sand-filtrated at the sand separator 7, chlorinated at the chlorinator 8, and stored in the distribution reservoir 9 for distribution.

According to the first embodiment, in a water treatment system 101 including a solid-liquid separator 51, activated carbon A adds in a water intake well 1 to adsorb thereon target substances in raw water, and collected at a liquid cyclone 20, thereby allowing for a considerably reduced amount of activated carbon A to outflow to a water reservoir well 2. That is, the water treatment system 101 allows for a reduced amount of substances as targets of flocculation, in comparison with methods of using a flocculant for aggregating, to precipitate, activated carbon together with other suspended substances.

Therefore, according to the first embodiment, in a water treatment system 101 including a solid-liquid separator 51, the amount of flocculant in use for aggregate sedimentation can be reduced. Moreover, according to the first embodiment, in a water treatment system 101 including a solid-liquid separator 51, a response time for flocculation can be minimized, allowing for a fast agitation basin 3, a flocculation basin 4, and a flocculating sedimentation basin 5 to be decreased in necessary volume, and scaled down. Still more, according to the first embodiment, in a water treatment system 101 including a solid-liquid separator 51, flocculation is enabled even with small agitation forces, allowing for reduced power consumption of agitators 3a and 4a, and a secured energy saving. In addition, according to the first embodiment, in a water treatment system 101 including a solid-liquid separator 51, the reduction is amount of substances as targets of flocculation allows for a reduced amount of sludge as a target to be wasted, as well.

Further, according to the first embodiment, a solid-liquid separator 51 includes a liquid cyclone 20 that implements solid-liquid separation by use of centrifugal forces stronger than gravity, allowing for a separation of activated carbon from raw water by a shorter period than a conventional thickener using a gravitational sedimentation system. Accordingly, the facility can be scaled down, permitting applications to water purifying plants of medium or minor scales, as well.

(Second Embodiment)

Description is now made of a water treatment system 102 including a solid-liquid separator 52 according to a second embodiment of the present invention, with reference to FIG. 4. FIG. 4 illustrates the solid-liquid separator 52 according to the second embodiment, which is different from the solid-liquid separator 51 illustrated in FIG. 2 according to the first embodiment, in that the solid-liquid separator 52 includes a pair of activated carbon adding systems 10 and 11 and a pair of liquid cyclones 20 and 21. That system adding activated carbon to a water intake well 1 is identified as a first activated carbon adding system 10, and that system adding activated carbon to a water reservoir well 2, as a second activated carbon adding system 11. That cyclone in a subsequent stage of the intake well 1 is identified as a first liquid cyclone 20, and that cyclone in a subsequent stage of the reservoir well 2, as a second liquid cyclone 21.

Specifically, the solid-liquid separator 52 according to the second embodiment is different from the solid-liquid separator 51 according to the first embodiment, in that it includes the second activated carbon adding system 11, and the second liquid cyclone 21. It is noted that like the water treatment system 101, the water treatment system 102 also has an flocculating sedimentation basin 5 for flocculating sedimentation treatment followed by an unshown treatment line including a sand separator 7, a chlorinator 8, and a distribution reservoir 9.

The reservoir well 2 temporarily stores raw water incoming from first liquid cyclone 20. The second activated carbon adding system 11 adds activated carbon A to raw water stored in the reservoir well 2. In the reservoir well 2, added activated carbon A adsorbs thereon foreign odor and taste components, minute amounts of toxic substances, and the like contained in raw water, as they have not been got rid of by activated carbon A added by the first activated carbon adding system 10. Like activated carbon added by the first activated carbon adding system 10, activated carbon A added by the second activated carbon adding system 11 may be, among others, woody activated carbon, coal activated carbon, or the like, providing that it is separable from raw water in the second liquid cyclone 21.

Raw water containing activated carbon A flows from the reservoir well 2, through an inflow line 21a, into the second liquid cyclone 21, where it is swirled along the wall, whereby activated carbon A is separated from raw water, which is discharged through an activated carbon discharge line 21b, while raw water having got rid of activated carbon is sent through a pretreated water outflow line 21c to a fast agitation basin 3.

According to the second embodiment, in a water treatment system 102 including a solid-liquid separator 52, activated carbon A is added in a reservoir well 2, where it adsorbs thereon, to remove, target substances in raw water that have not been discharged at a first liquid cyclone 20, and activated carbon A is collected at a second liquid cyclone 21, so pretreated raw water flows out thereof to a fast agitation basin 3. The water treatment system 102 thus allows for a reduced amount of substances as targets of flocculation in flocculating sedimentation. Therefore, according to the second embodiment, in a water treatment system 102 including a solid-liquid separator 52, the amount of flocculant used for flocculating sedimentation can be reduced, enabling a reaction time for flocculation to be shortened, allowing for reduced power consumption of agitators 3a and 4a.

(First Modification of Second Embodiment)

Figure 5:
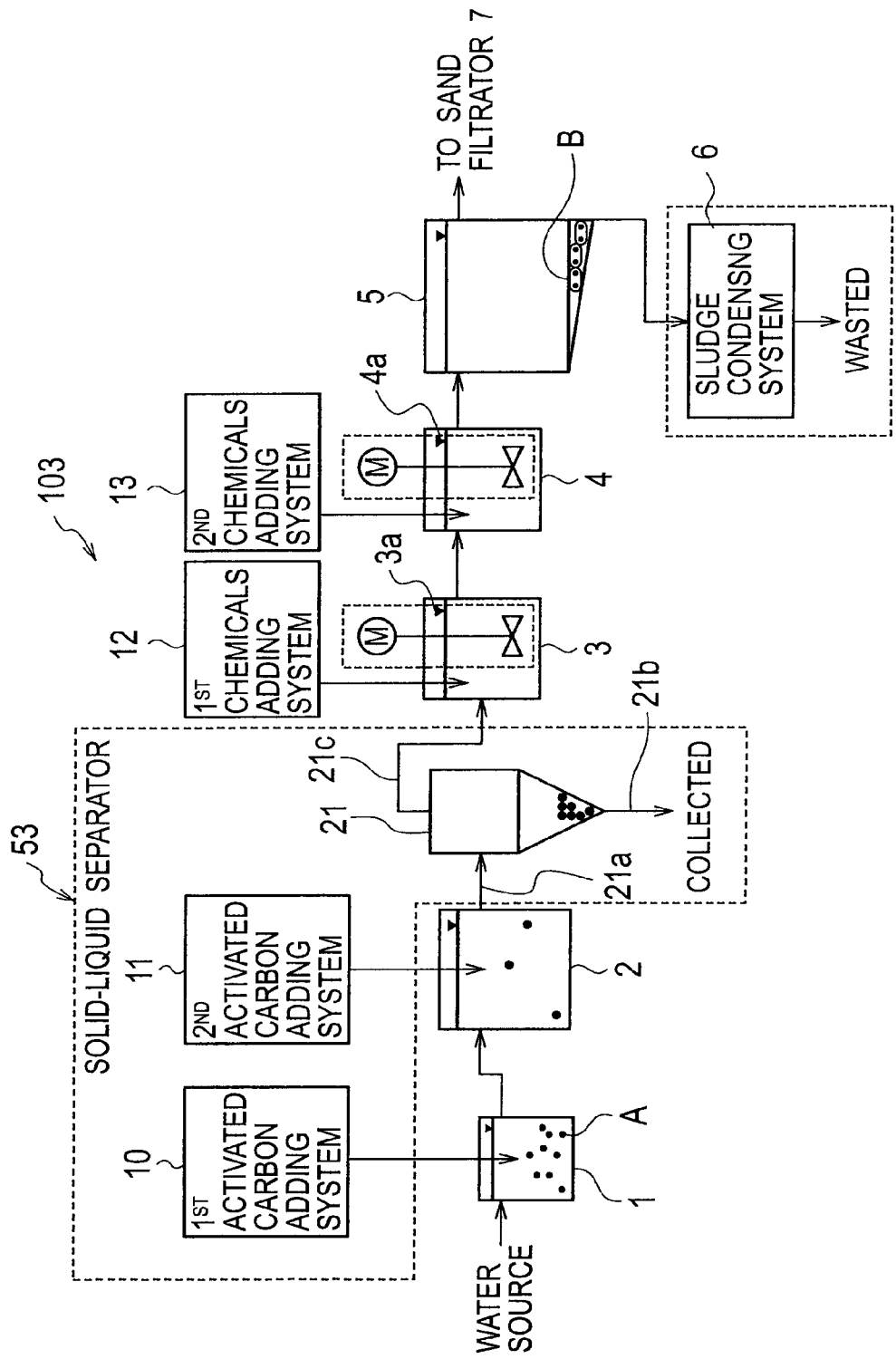
FIG. 5 is an explanatory flow diagram of a water treatment system including a solid-liquid separator according to a first modification of the second embodiment.

Description is now made of a water treatment system 103 including a solid-liquid separator 53 according to a first modification of the second embodiment of the present invention, with reference to FIG. 5. FIG. 5 illustrates the solid-liquid separator 53 according to the first modification of the second embodiment, which is different from the solid-liquid separator 52 illustrated in FIG. 4 according to the second embodiment, in that it has not any liquid cyclone between a water intake well 1 and a water reservoir well 2, and has a liquid cyclone 21 simply in a subsequent stage of the reservoir well 2. Accordingly, the liquid cyclone 21 in a post-processing stage of the reservoir well 2 serves to collect both activated carbon A added to raw water in the intake well 1 by a first activated carbon adding system 10, and activated carbon A added to raw water in the reservoir well 2 by a second activated carbon adding system 11.

According to the first modification of the second embodiment, in a solid-liquid separator 53, activated carbon A added to raw water in an intake well 1 by a first activated carbon adding system 10 is collected by a liquid cyclone 21 in a subsequent stage of a reservoir well 2, with an extended reaction time for adsorption. Further, according to the first modification of the second embodiment, in a solid-liquid separator 53, pieces of activated carbon of small particle diameters are united together, forming clusters of large particle diameters, thus having greater centrifugal forces acting thereon, allowing for an enhanced collection rate of the liquid cyclone 21.

(Second Modification of Second Embodiment)

Figure 6:
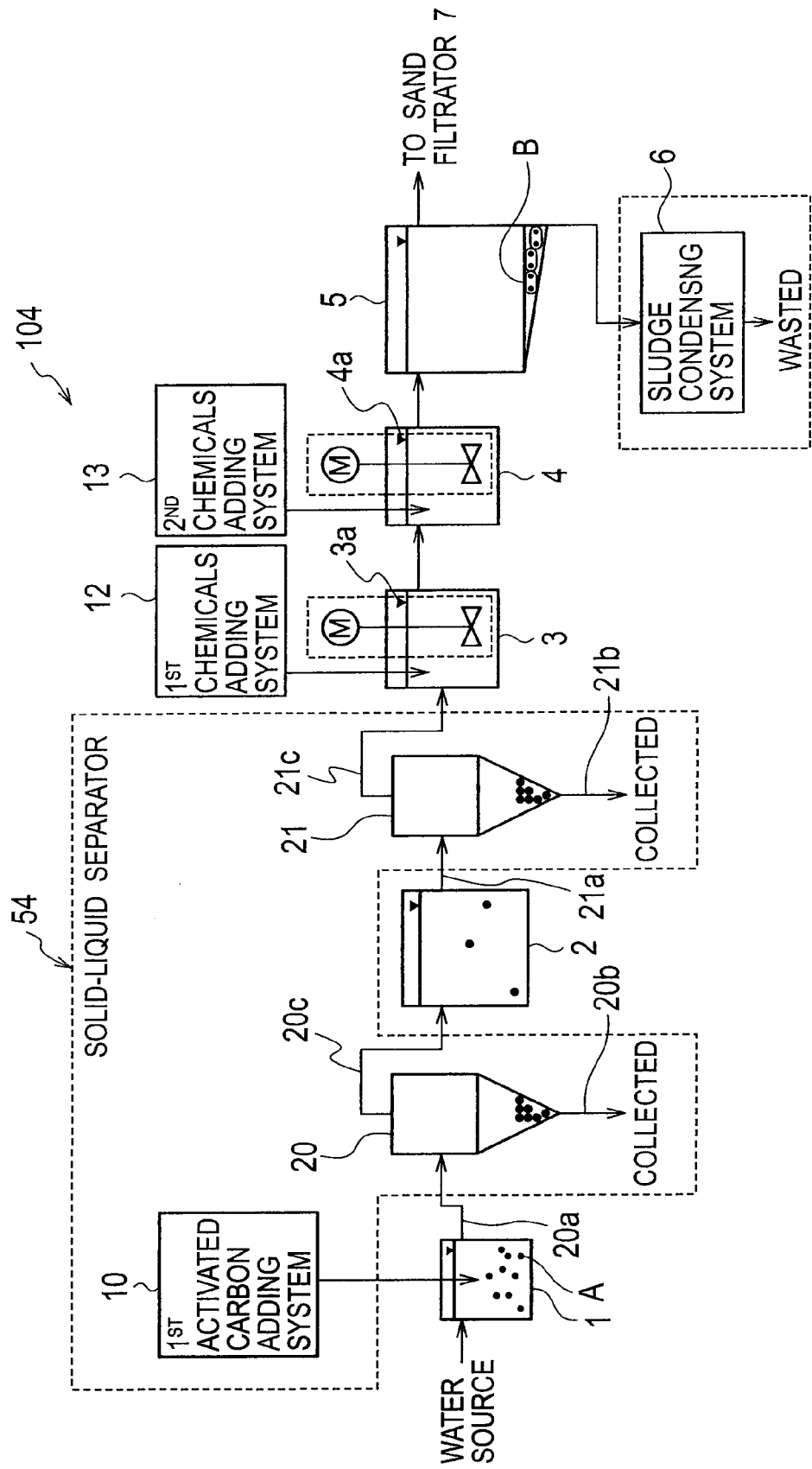
FIG. 6 is an explanatory flow diagram of a water treatment system including a solid-liquid separator according to a second modification of the second embodiment.

Description is now made of a water treatment system 104 including a solid-liquid separator 54 according to a second modification of the second embodiment of the present invention, with reference to FIG. 6. FIG. 6 illustrates the solid-liquid separator 54 according to the second modification of the second embodiment, which is different from the solid-liquid separator 52 illustrated in FIG. 4 according to the second embodiment, in that it has not any activated carbon adding system for supplying activated carbon to a water reservoir well 2, and simply has an activated carbon adding system 10 for supplying activated carbon to a water intake well 1.

Accordingly, activated carbon A added to raw water in the intake well 1 by the activated carbon adding system 10 is collected at a first liquid cyclone 20 in a subsequent stage of the intake well 1, and residue activated carbon that has not been collected there is collected at a second liquid cyclone 21 in a subsequent process of the reservoir well 2.

According to the second modification of the second embodiment, in a solid-liquid separator 54, activated carbon A added in an intake well 1 by a first activated carbon adding system 10 is collected by a first liquid cyclone 20 in a subsequent stage of the intake well 1 and by a second liquid cyclone 21 in a subsequent stage of a reservoir well 2, with an extended reaction time for adsorption. And, according to the second modification of the second embodiment, in a solid-liquid separator 54, pieces of activated carbon of small particle diameters are united together, forming clusters of large particle diameters, thus having greater centrifugal forces acting thereon, allowing for an enhanced collection rate by combination of liquid cyclones 20 and 21.

(Third Embodiment)

Figure 7:
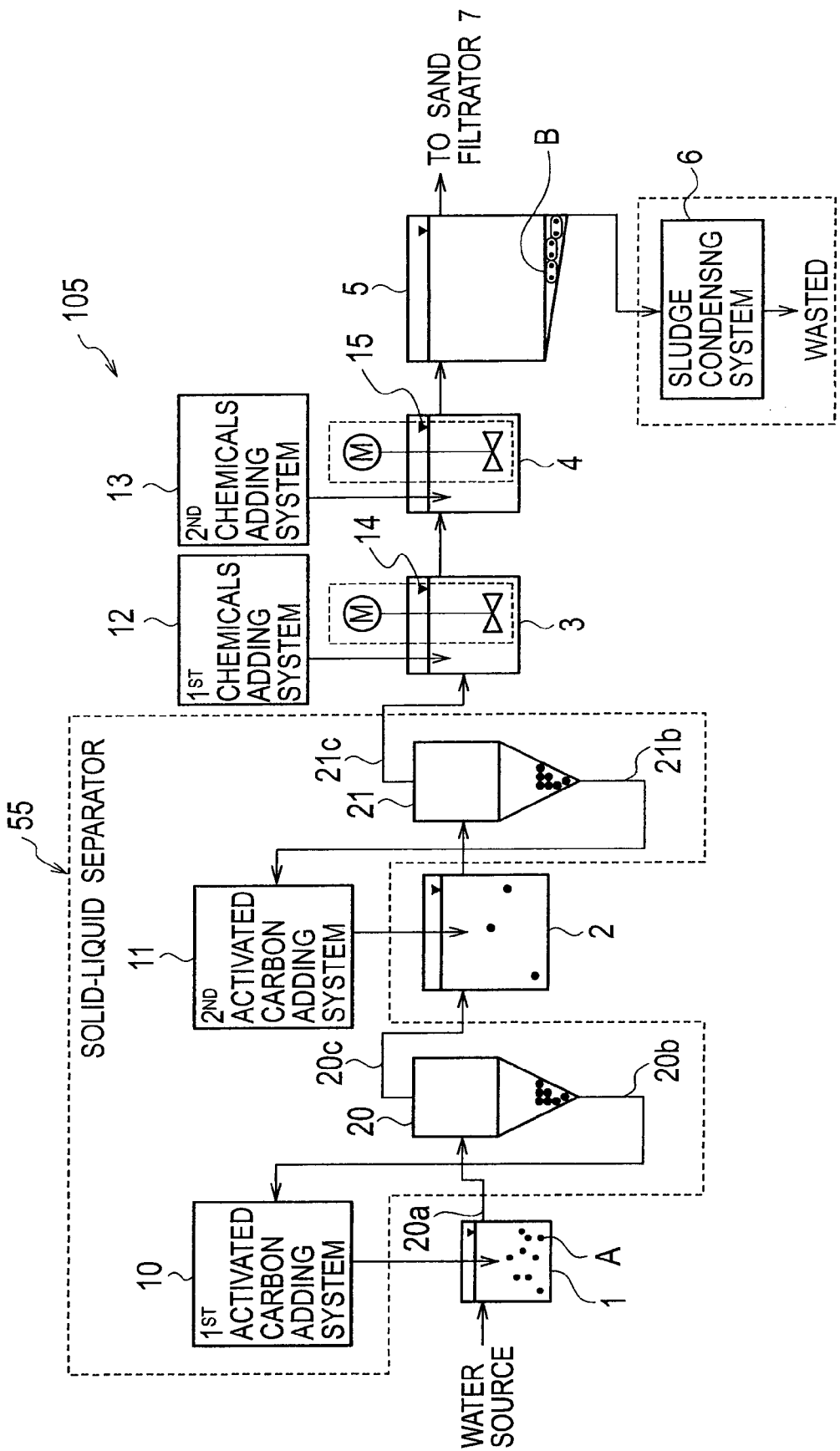
FIG. 7 is an explanatory flow diagram of a water treatment system including a solid-liquid separator according to a third embodiment of the present invention.

Description is now made of a water treatment system 105 including a solid-liquid separator 55 according to a third embodiment of the present invention, with reference to FIG. 7. FIG. 7 illustrates the solid-liquid separator 55 according to the third embodiment, which is different from the solid-liquid separator 52 illustrated in FIG. 4 according to the second embodiment, in that the solid-liquid separator 55 includes: an activated carbon discharge line 20b adapted for discharge of activated carbon A from a first liquid cyclone 20, and configured as a return line for recirculation to be connected with a first activated carbon adding system 10; and an activated carbon discharge line 21b adapted for discharge of activated carbon A from a second liquid cyclone 21, and configured as a return line for recirculation to be connected with a second activated carbon adding system 11. It is noted that like the water treatment system 101, the water treatment system 105 also has a flocculating sedimentation basin 5 for flocculating sedimentation treatment followed by an unshown treatment line including a sand separator 7, a chlorinator 8, and a distribution reservoir 9.

Activated carbon added to raw water has an adsorption capacity of adsorbing thereon, among others, foreign odor and taste components and residue toxic substances, which can survive repeated recycling till it turns down to a state of breakthrough. In this respect, streams of activated carbon discharged from the liquid cyclones 20 and 21 are returned through the activated carbon discharge lines 20b and 21b to the activated carbon adding systems 10 and 11, respectively.

Activated carbon A returned through the activated carbon discharge line 20b to the first activated carbon adding system 10 is again added in a water intake well 1. Activated carbon A returned through the activated carbon discharge line 21b to the second activated carbon adding system 11 is again added in a water reservoir well 2. The activated carbon adding systems 10 and 11 may mix new activated carbon A to activated carbon A being recycled to add in the intake well 1 and the reservoir well 2, respectively.

According to the third embodiment, in a solid-liquid separator 55, activated carbon adding systems 10 and 11 recycle activated carbon A discharged from liquid cyclones 20 and 21, to add in an intake well 1 and a reservoir well 2, respectively. And, according to the third embodiment, in a solid-liquid separator 55, activated carbon A can be used without undue losses, allowing for a reduced running cost.

It is noted that discharged activated carbon from liquid cyclone may well be likewise recirculated to recycle through activated carbon adding system, even in the case of provision of a single liquid cyclone as in FIG. 2 or FIG. 5, or in the case of provision of a single activated carbon adding system as in FIG. 2 or FIG. 6.

(Fourth Embodiment)

Figure 8:
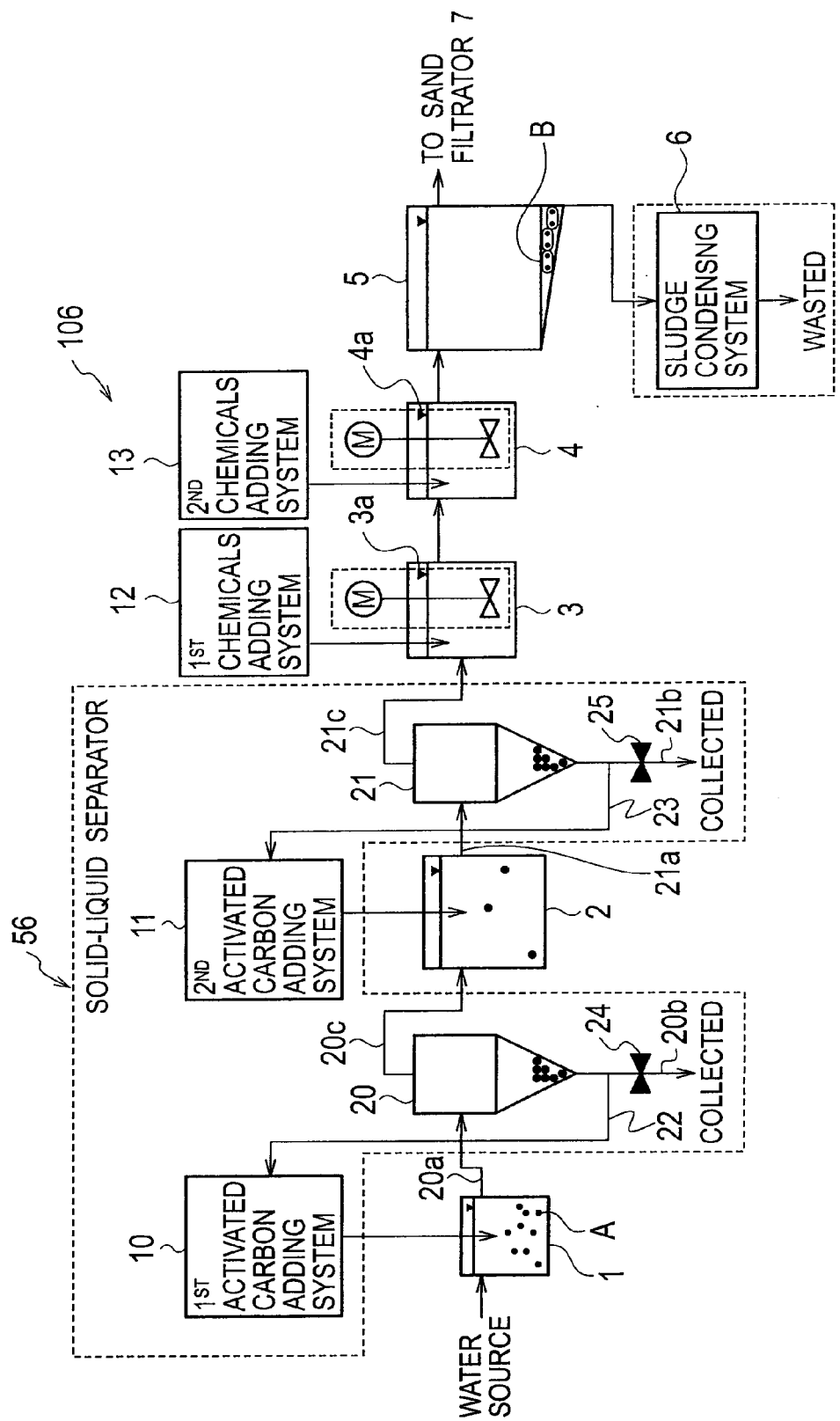
FIG. 8 is an explanatory flow diagram of a water treatment system including a solid-liquid separator according to a fourth embodiment of the present invention.

Description is now made of a water treatment system 106 including a solid-liquid separator 56 according to a fourth embodiment of the present invention, with reference to FIG. 8. FIG. 8 illustrates the solid-liquid separator 56 according to the fourth embodiment, which is different from the solid-liquid separator 55 illustrated in FIG. 7 according to the third embodiment, in that it includes: a first return line 22, which is on-off controllable to return activated carbon A discharged from a first liquid cyclone 20 through an activated carbon discharge line 20b, to a first activated carbon adding system 10; and a second return line 23, which is on-off controllable to return activated carbon A discharged from a second liquid cyclone 21 through an activated carbon discharge line 21b, to a second activated carbon adding system 11. It is noted that like the water treatment system 101, the water treatment system 106 also has a flocculating sedimentation basin 5 for an aggregate sedimentation treatment followed by an unshown treatment line including a sand separator 7, a chlorinator 8, and a distribution reservoir 9.

For the first return line 22, the activated carbon discharge line 20b has a branched portion thereof provided with a valve 24 in terms of a valve unit that may include a collection valve and a return valve, which is operable so that activated carbon A discharged from the first liquid cyclone 20 is: returned through the first return line 22 to the first activated carbon adding system 10, so long as it is reusable; or discharged through the activated carbon discharge line 20b, without being returned to the first activated carbon adding system 10, when it has become unable to reuse after repeated recycling. For the second return line 23, the activated carbon discharge line 21b has a branched portion thereof provided with a valve 25 in terms of a valve unit that may include a collection valve and a return valve, which is operable so that activated carbon A discharged from the second liquid cyclone 21 is: returned through the second return line 23 to the second activated carbon adding system 11, so long as it is reusable; or discharged through the activated carbon discharge line 21b, without being returned to the second activated carbon adding system 11, when it has become unable to reuse after repeated recycling.

It may be determined whether activated carbon A is reusable or not, from: a difference between a breakthrough point and a concentration of substances to be adsorbed in a water intake well 1 or in a water reservoir well 2; an estimation of adsorption capacity of activated carbon A based on data such as of a sensor provided to the liquid cyclone 20 or 21 or on the activated carbon discharge line 20b or 21b; or a time number detected by a counter for counting the number of times an input amount of activated carbon is recycled.

In regard of activated carbon in use, the adsorption property changes depending on, among others, the type of raw material and the production method, and by concentrations and kinds of adsorbed matter. There should thus be a guide or reference prepared after practical adsorption tests, to provide information on conditions that lead to a breakthrough, as well as breakthrough points.

For instance, as principal information, there are desirable activated carbon input rates, and commensurate breakthrough periods, which can be predicted by use of an expression (1), such that:

$$q_e = a\, Ce^{1/n} \tag{1}$$

where '$q_e$' is an adsorption amount per unit activated carbon, '$Ce$' is a concentration of adsorbed matter in equilibrium under constant temperature, '$a$' is an empirical adsorption factor, and '$n$' is an empirical adsorption index. The expression (1) can be used to determine $q_e$ as an adsorption amount by activated carbon reaching a breakthrough, when the adsorbed matter concentration Ce has become constant.

According to the fourth embodiment, in a solid-liquid separator 56, activated carbon adding systems 10 and 11 recycle no more than reusable activated carbon, so activated carbon A can be used without undue losses, with an enhanced capacity for adsorption of foreign odor and taste components, minute amounts of toxic substances, and the like by activated carbon A. And, according to the fourth embodiment, in a solid-liquid separator 56, the amount of flocculant used for flocculating sedimentation can also be reduced.

Further, according to the fourth embodiment, a solid-liquid separator 56 is adapted to use recycled activated carbon A and new activated carbon A in combination, eliminating the need of shutting down liquid cyclones 20 and 21 to input new activated carbon A to activated carbon adding systems 10 and 11, thus allowing for a continued operation of the water treatment system 106.

It is noted that discharged activated carbon from liquid cyclone may well be likewise recirculated to recycle through activated carbon adding system, even in the case of provision of a single liquid cyclone as in FIG. 2 or FIG. 5, or in the case of provision of a single activated carbon adding system as in FIG. 2 or FIG. 6.

(Fifth Embodiment)

Figure 9:
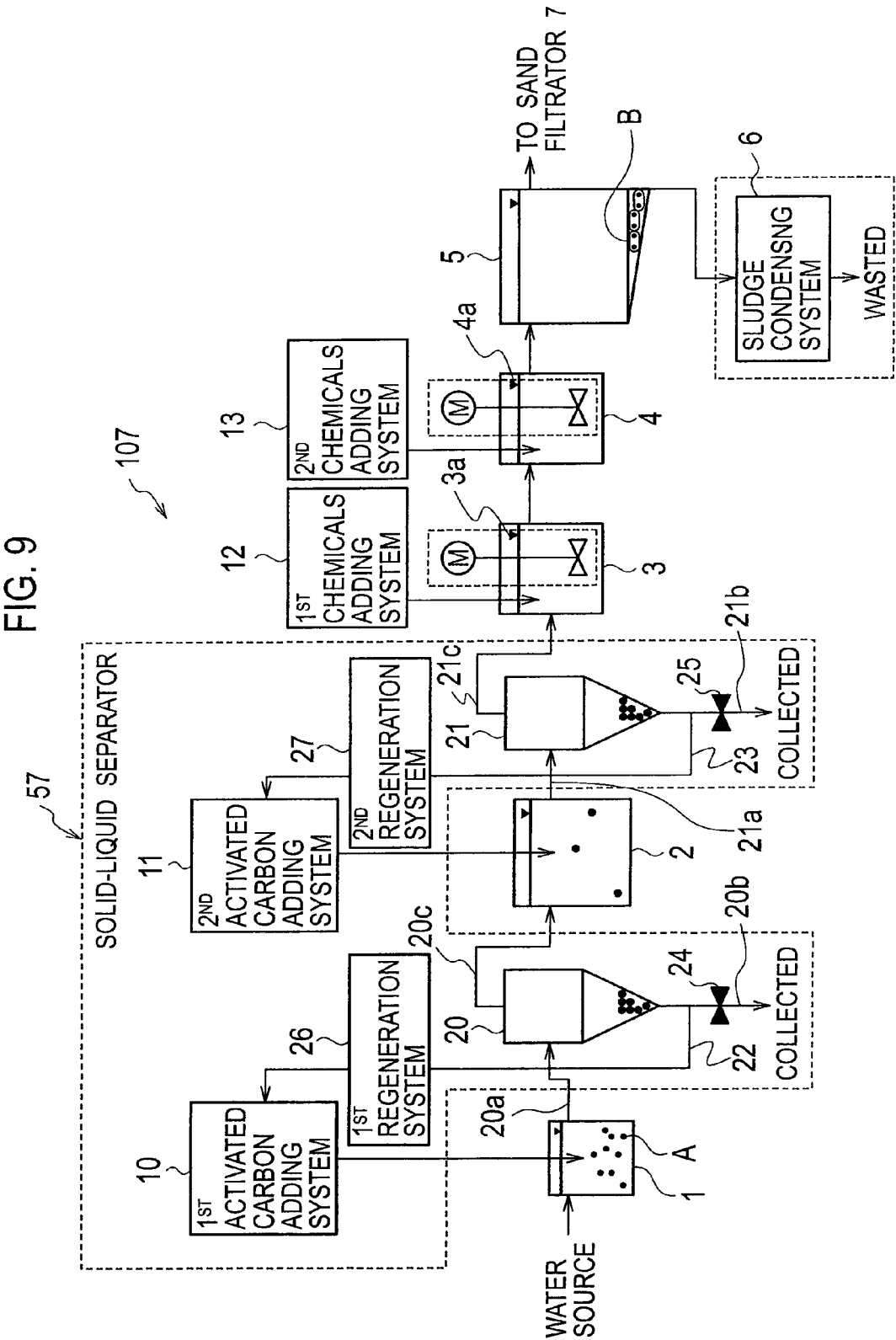
FIG. 9 is an explanatory flow diagram of a water treatment system including a solid-liquid separator according to a fifth embodiment of the present invention.

Description is now made of a water treatment system 107 including a solid-liquid separator 57 according to a fifth embodiment of the present invention, with reference to FIG. 9. FIG. 9 illustrates the solid-liquid separator 57 according to the fifth embodiment, which is different from the solid-liquid separator 56 illustrated in FIG. 8 according to the fourth embodiment, in that it has: a first return line 22 including a first regeneration system 26; and a second return line 23 including a second regeneration system 27. It is noted that like the water treatment system 101, the water treatment system 106 also has a flocculating sedimentation basin 5 for flocculating sedimentation treatment followed by an unshown treatment line including a sand separator 7, a chlorinator 8, and a distribution reservoir 9.

The first regeneration system 26 regenerates or reproduces an adsorption capacity of activated carbon A discharged from a first liquid cyclone 20, to supply via the first return line 22 to a first activated carbon adding system 10. The second regeneration system 27 regenerates or reproduces an adsorption capacity of activated carbon A discharged from a second liquid cyclone 21, to supply via the second return line 23 to a second activated carbon adding system 11. The regeneration systems 26 and 27 may use, for instance, a water vapor activation method for regenerating an adsorption capacity of activated carbon A. Such activated carbon A that is un-regenerative to restore the adsorption capacity is discharged through an activated carbon discharge line 20b or 21b.

According to the fifth embodiment, in a solid-liquid separator 57, activated carbon adding systems 10 and 11 recycle activated carbon A with a restored adsorption capacity, so activated carbon A can be used without undue losses, with an enhanced capacity for adsorption of foreign odor and taste components, minute amounts of toxic substances, and the like by activated carbon A. According to the fifth embodiment, in a water treatment system 107 including a solid-liquid separator 57, the amount of flocculant used for flocculating sedimentation can also be reduced.

It is noted that discharged activated carbon from liquid cyclone may well be likewise recirculated to recycle through activated carbon adding system, even in the case of provision of a single liquid cyclone as in FIG. 2 or FIG. 5, or in the case of provision of a single activated carbon adding system as in FIG. 2 or FIG. 6. Further, the regeneration system 26 or 27 may be adapted to suspend a regeneration process for activated carbon A discharged from the liquid cyclone 20 or 21, so long as an adsorption capacity thereof is kept from turning down, and enter the regeneration process simply when the adsorption capacity of activated carbon has turned down, to supply activated carbon to the carbon adding system 10 or 11.

(First Modification of Fifth Embodiment)

Figure 10:
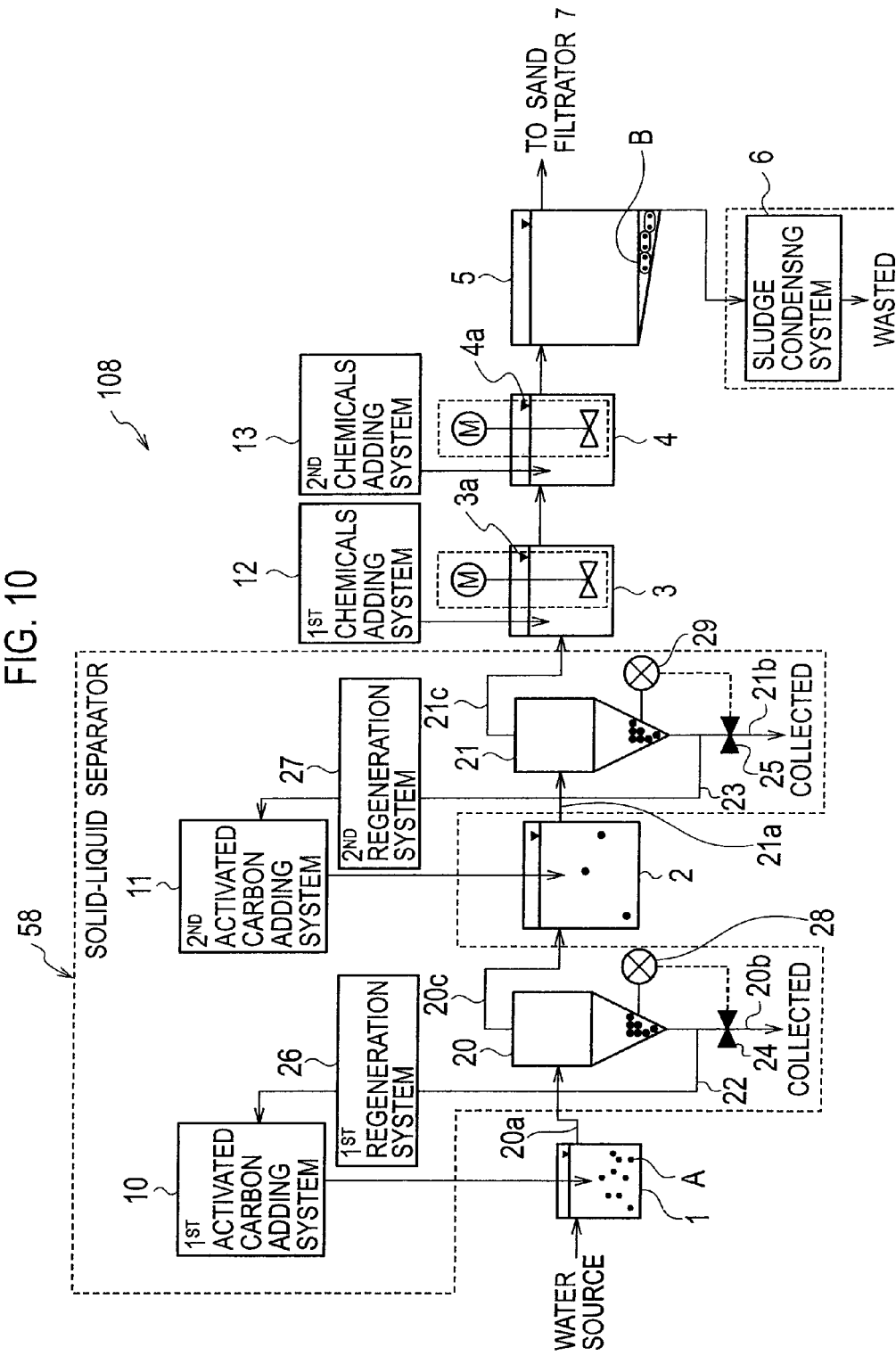
FIG. 10 is an explanatory flow diagram of a water treatment system including a solid-liquid separator according to a first modification of the fifth embodiment.

Description is now made of a water treatment system 108 including a solid-liquid separator 58 according to a first modification of the fifth embodiment of the present invention, with reference to FIG. 10. FIG. 10 illustrates the solid-liquid separator 58 according to the first modification of the fifth embodiment, which is different from the solid-liquid separator 57 illustrated in FIG. 9 according to the fifth embodiment, in that it has: a first sludge sensor 28 provided to a first liquid cyclone 20; and a second sludge sensor 29 provided to a second liquid cyclone 21.

The first sludge sensor 28 is configured to detect a quantity of activated carbon A contained in raw water in the first liquid cyclone 20. The first sludge sensor 28 provides a detection result, whereon a discharge or collection rate of activated carbon A from the first liquid cyclone 20 is determined, whereby an associated valve 24 is controlled for open-close operations. The second sludge sensor 29 is configured to detect a quantity of activated carbon A contained in raw water in the second liquid cyclone 21. The second sludge sensor 29 provides a detection result, whereon a discharge or collection rate of activated carbon A from the second liquid cyclone 21 is determined, whereby an associated valve 25 is controlled for open-close operations.

The sludge sensors 28 and 29 may be a turbidimeter, a fluoresceneces sensor, a conductivity detection device, etc.

According to the first modification of the fifth embodiment, in a solid-liquid separator 58, control is made of a discharge or collection rate of activated carbon A from each of the liquid cyclones 20 and 21. Therefore, according to the first modification of the fifth embodiment, a solid-liquid separator 58 allows for a reduced amount of activated carbon A carried to a fast agitation basin 3, and a reduced amount of flocculant used for flocculating sedimentation.

It is noted that a determination may be likewise made of a discharge or collection rate of activated carbon from liquid cyclone, even in the case of provision of a single liquid cyclone as in FIG. 2 or FIG. 5.

(Second Modification of Fifth Embodiment)

Figure 11:
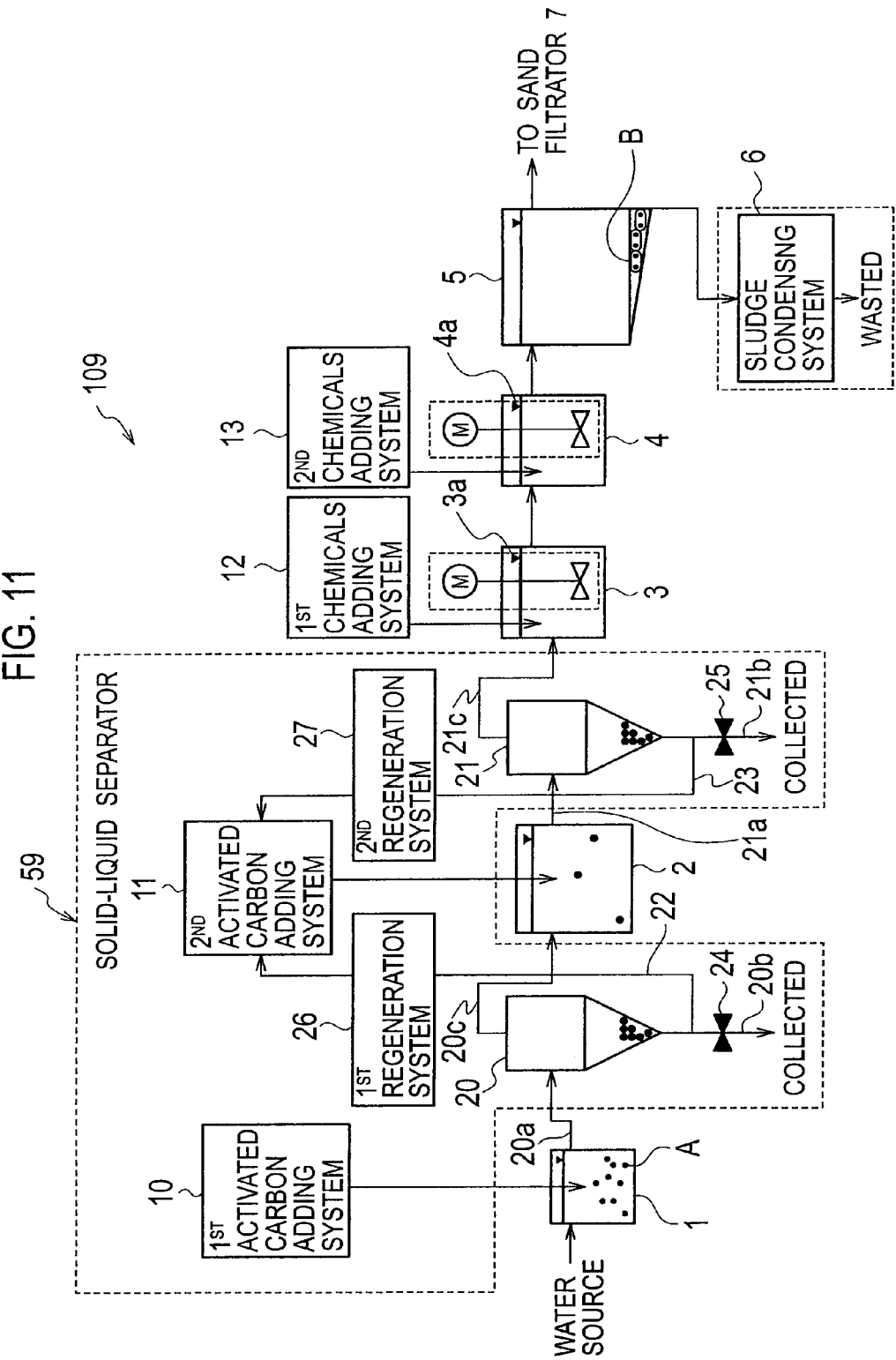
FIG. 11 is an explanatory flow diagram of a water treatment system including a solid-liquid separator according to a second modification of the fifth embodiment.

Description is now made of a water treatment system 109 including a solid-liquid separator 59 according to a second modification of the fifth embodiment of the present invention, with reference to FIG. 11. FIG. 11 illustrates the solid-liquid separator 59 according to the second modification of the fifth embodiment, which is different from the solid-liquid separator 57 illustrated in FIG. 9 according to the fifth embodiment, in that it supplies activated carbon A discharged from a first regenerating system 26, not to a first activated carbon adding system 10, but to a second activated carbon adding system 11. As a result, activated carbon A added by the first activated carbon adding system 10 is always new.

According to the second modification of the fifth embodiment, in a solid-liquid separator 59, new activated carbon A is added to raw water in a water intake well 1 that has greater contents of foreign odor and taste components, residue toxic substances, and the like as targets to be adsorbed, and recycled activated carbon A is added to raw water in a water reservoir well 2 that has once got ride of foreign odor and taste components, minute amounts of toxic substances, and the like by collection at a first liquid cyclone 20. Therefore, according to the second modification of the fifth embodiment, a solid-liquid separator 59 allows for a efficient use of activated carbon A.

(Sixth Embodiment)

Figure 12:
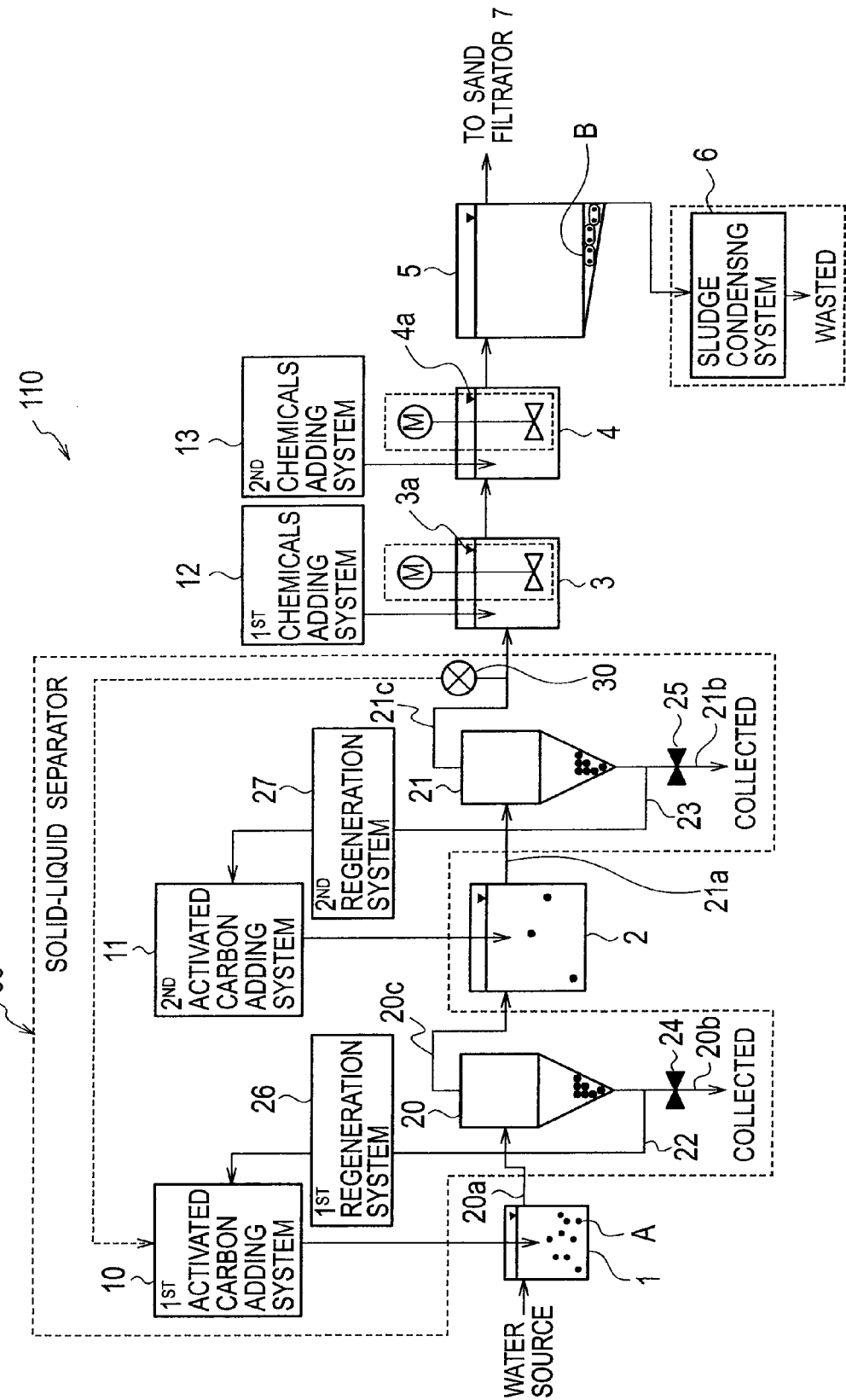
FIG. 12 is an explanatory flow diagram of a water treatment system including a solid-liquid separator according to a sixth embodiment of the present invention.

Description is now made of a water treatment system 110 including a solid-liquid separator 60 according to a sixth embodiment of the present invention, with reference to FIG. 12. FIG. 12 illustrates the solid-liquid separator 60 according to the sixth embodiment, which is different from the solid-liquid separator 57 illustrated in FIG. 9 according to the fifth embodiment, in that it has a water quality sensor 30 for analysis, detection, or measurement of a water quality of raw water outgoing from a second liquid cyclone 21. It is noted that like the water treatment system 101, the water treatment system 110 also has a flocculating sedimentation basin 5 for flocculating sedimentation treatment followed by an unshown treatment line including a sand separator 7, a chlorinator 8, and a distribution reservoir 9.

The water quality sensor 30 outputs a result of water quality measurement to a first activated carbon adding system 10. The first activated carbon adding system 10 controls a quantity of activated carbon A to be added in a water intake well 1 in accordance with the result of measurement from the water quality sensor 30. For instance, the first activated carbon adding system 10 increases the rate of addition of activated carbon A relative to a current rate, if it is determined from a result or results of measurement by the water quality sensor 30 that much suspended matter is contained. The first activated carbon adding system 10 has expressions, graphic data, or tables defining relationships between items of water quality and quantities of added activated carbon A, and increases or decreases the rate of addition of activated carbon A, as circumstances require.

The water quality sensor 30 may include, for instance, a sensor for detecting a typical item of water quality such as turbidity or conductivity of raw water, alone or in combination with a sensor for detecting a specific item of water quality such as fluorescent intensity or ultraviolet absorption (E260).

According to the sixth embodiment, in a solid-liquid separator 60, control is made of an adding rate of activated carbon A depending on a water quality of raw water outflowing from a second liquid cyclone 21, as it is measured by a water quality sensor 30. Therefore, according to the sixth embodiment, a solid-liquid separator 60 is kept from adding an excessive amount of activated carbon, thus allowing for use of an optimized amount of activated carbon.

It is noted that a determination may be likewise made of an adding rate of activated carbon depending on a measurement of quality of raw water outgoing from liquid cyclone, even in the case of provision of a single liquid cyclone as in FIG. 2 or FIG. 5.

(Seventh Embodiment)

Figure 13:
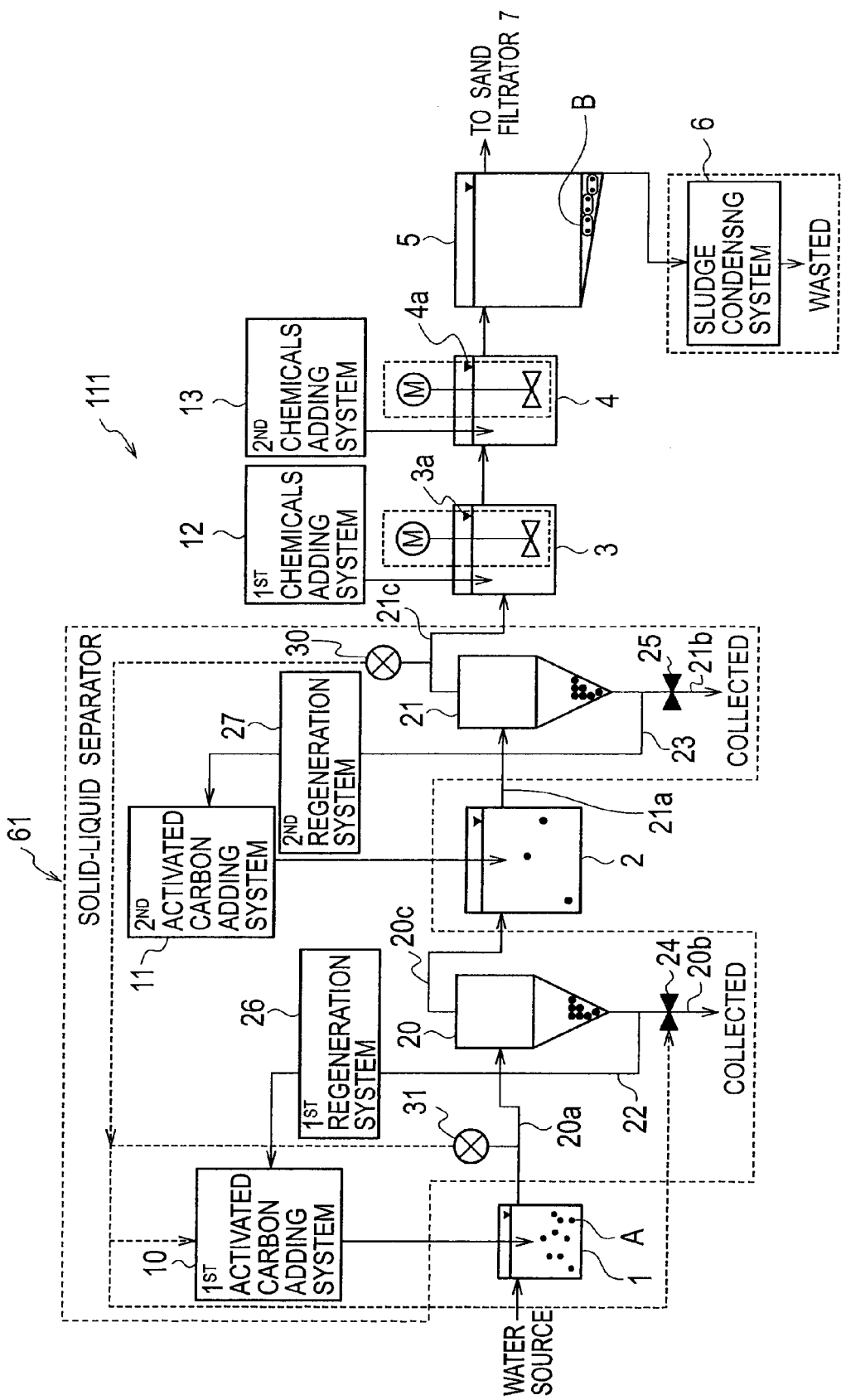
FIG. 13 is an explanatory flow diagram of a water treatment system including a solid-liquid separator according to a seventh embodiment of the present invention.

Description is now made of a water treatment system 111 including a solid-liquid separator 61 according to a seventh embodiment of the present invention, with reference to FIG. 13. FIG. 13 illustrates the solid-liquid separator 61 according to the seventh embodiment, which is different from the solid-liquid separator 60 illustrated in FIG. 12 according to the sixth embodiment, in that it has a water quality sensor 31 for analysis, detection, or measurement of a water quality of raw water running in a first inflow line 20a. For identification, that water quality sensor 31 which measures a water quality of raw water running in the first inflow line 20a is referred herein to as a first water quality sensor, and that water quality sensor 30 which measures a water quality of pretreated water running in a second pretreated water outflow line 21c, as a second water quality sensor. It is noted that like the water treatment system 101, the water treatment system 111 also has a flocculating sedimentation basin 5 for flocculating sedimentation treatment followed by an unshown treatment line including a sand separator 7, a chlorinator 8, and a distribution reservoir 9.

A result of water quality measurement by the first water quality sensor 31 and a result of water quality measurement by the second water quality sensor 30 are both output to a first activated carbon adding system 10. The first activated carbon adding system 10 controls a quantity of activated carbon A to be added in a water intake well 1 in accordance with a difference between the result of water quality measurement by the first water quality sensor 31 and the result of water quality measurement by the second water quality sensor 30. For instance, the first activated carbon adding system 10 determines that the quantity of activated carbon is short to a concentration of adsorbed matter, when the difference between the results of water quality measurement by the first water quality sensor 31 and the second water quality sensor 30 is relatively small, and increases the rate of addition of activated carbon A relative to a current rate The result of water quality measurement by the first water quality sensor 31 and the result of water quality measurement by the second water quality sensor 30 have a difference in between, whereon a discharge or collection rate of activated carbon A from a first liquid cyclone 20 is determined, whereby an associated valve 24 is controlled for open-close operations. For instance, for a small difference between results of water quality measurement by the first water quality sensor 31 and the second water quality sensor 30, the first activated carbon adding system 10 increases the rate of addition of activated carbon A, and the discharge or collection rate is increased, as well.

The first water quality sensor 31, as well as the second water quality sensor 30, may include, for instance, a sensor for detecting a typical item of water quality such as turbidity or conductivity of raw water, alone or in combination with a sensor for detecting a specific item of water quality such as fluorescent intensity or ultraviolet absorption (E260).

According to the seventh embodiment, in a solid-liquid separator 61, control is made of an adding rate of activated carbon A to a water intake well 1, and a discharge or collection rate of activated carbon A from a first liquid cyclone 20, in accordance with a water quality of raw water outflowing from the intake well 1, and a water quality of raw water outflowing from a second liquid cyclone 21. Therefore, according to the seventh embodiment, a solid-liquid separator 61 is adapted for an optimized water quality of raw water to be supplied to a fast agitation basin 3, allowing for use of a reduced amount of flocculant for flocculating sedimentation.

(Eighth Embodiment)

Figure 14:
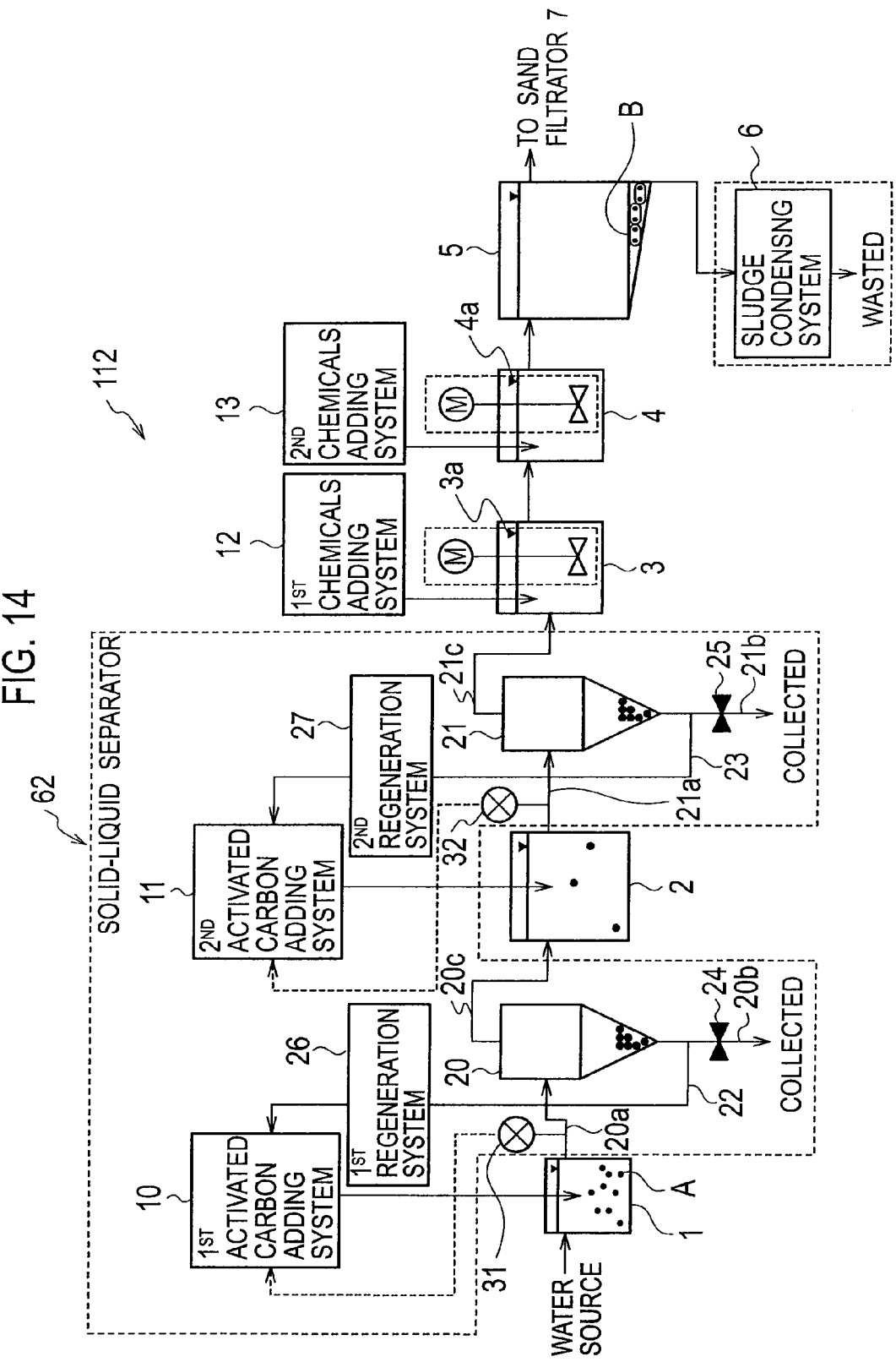
FIG. 14 is an explanatory flow diagram of a water treatment system including a solid-liquid separator according to an eighth embodiment of the present invention.

Description is now made of a water treatment system 112 including a solid-liquid separator 62 according to an eighth embodiment of the present invention, with reference to FIG. 14. FIG. 14 illustrates the solid-liquid separator 62 according to the eighth embodiment, which is different from the solid-liquid separator 57 illustrated in FIG. 9 according to the fifth embodiment, in that it has water quality sensors 31 and 32 for analysis, detection, or measurement of water qualities of raw water running in first and second inflow lines 20a and 21a, respectively. For identification, that water quality sensor 31 which measures a water quality of raw water running in the first inflow line 20a is referred herein to as the first water quality sensor, and that water quality sensor 32 which measures a water quality of raw water running in the second inflow line 21c, as a third water quality sensor. It is noted that like the water treatment system 101, the water treatment system 112 also has a flocculating sedimentation basin 5 for flocculating sedimentation treatment followed by an unshown treatment line including a sand separator 7, a chlorinator 8, and a distribution reservoir 9.

There is a first activated carbon adding system 10 controlling a quantity of activated carbon A to be added in a water intake well 1 in accordance with a result of measurement of water quality by the first water quality sensor 31. For instance, the first activated carbon adding system 10 increases the rate of addition of activated carbon A relative to a current rate, if it is determined from a result or results of measurement by the first water quality sensor 31 that much suspended matter is contained.

Likewise, there is a second activated carbon adding system 11 controlling a quantity of activated carbon A to be added in a water reservoir well 2 in accordance with a result of measurement of water quality by the third water quality sensor 32. For instance, the second activated carbon adding system 11 increases the rate of addition of activated carbon A relative to a current rate, if it is determined from a result or results of measurement by the third water quality sensor 32 that much suspended matter is contained.

The water quality sensors 31 and 32 may be, for instance, a sensor for detecting a typical item of water quality such as turbidity or conductivity of raw water, alone or in combination with a sensor for detecting a specific item of water quality such as fluorescent intensity or ultraviolet absorption (E260).

According to the eighth embodiment, in a solid-liquid separator 62, an adding rate of activated carbon A to a water intake well 1 is controlled in accordance with a water quality of raw water outflowing from the intake well 1, and an adding rate of activated carbon A to a water reservoir well 2 is controlled in accordance with a water quality of raw water outflowing from the reservoir well 2. Therefore, according to the eighth embodiment, a solid-liquid separator 62 is adapted for an optimized water quality of raw water to be supplied to a fast agitation basin 3, allowing for use of a reduced amount of flocculant for flocculating sedimentation.

It is noted that a water quality of raw water after addition of activated carbon A may well be likewise measured to thereby control an adding rate of activated carbon, even in the case of provision of a single liquid cyclone as in FIG. 2 or FIG. 5, or in the case of provision of a single activated carbon adding system as in FIG. 2 or FIG. 6.

As will be seen from the foregoing description, according to the present invention, amounts of chemicals used can be reduced, allowing for production of a reduced quantity of sludge.

While preferred embodiments of the present invention have been described using specific terms, such description is for illustrative purposes, and it is to be understood that changes and variations may be made without departing from the spirit or scope of the following claims.

What is claimed is:

1. A solid-liquid separator system comprising:
   an activated carbon adder configured to add activated carbon to raw water upstream of a flocculation sedimentation unit, to adsorb suspended matter contained in raw water;
   a liquid cyclone adapted to separate activated carbon with suspended matter adsorbed thereon, from raw water containing activated carbon;
   an inflow line configured for connection thereof with the liquid cyclone to cause raw water containing activated carbon before flocculating sedimentation to flow into the liquid cyclone and swirl therein;
   an activated carbon discharge line configured to discharge activated carbon spun down out of raw water containing activated carbon in the liquid cyclone, from the liquid cyclone;
   a pretreated water discharge line configured to discharge raw water having got rid of activated carbon as pretreated water from the liquid cyclone;
   a sensor adapted to detect a quantity of activated carbon contained in raw water in the liquid cyclone; and
   a controller adapted to control a valve installed on the activated carbon discharge line and configured to adjust a discharge rate of activated carbon of the activated carbon discharge line in accordance with a detection result of the sensor.

2. A solid-liquid separator system comprising:
   an activated carbon adder configured to add activated carbon to raw water upstream of a flocculation sedimentation unit, to adsorb suspended matter contained in raw water;
   a liquid cyclone adapted to separate activated carbon with suspended matter adsorbed thereon, from raw water containing activated carbon;
   an inflow line configured for connection thereof with the liquid cyclone to cause raw water containing activated carbon before flocculating sedimentation to flow into the liquid cyclone and swirl therein;
   an activated carbon discharge line configured to discharge activated carbon spun down out of raw water containing activated carbon in the liquid cyclone, from the liquid cyclone;
   a pretreated water discharge line configured to discharge raw water having got rid of activated carbon as pretreated water from the liquid cyclone;
   a first sensor adapted to detect a quantity of activated carbon contained in raw water running to flow into the liquid cyclone;
   a second sensor adapted to detect a quantity of activated carbon contained in pretreated water being discharged from the liquid cyclone; and
   a valve installed on the activated carbon discharge line, and configured to increase a discharge rate of activated carbon relative to a current rate of the activated carbon discharge line when a difference between a detection result of the first sensor and a detection result of the second sensor is relatively small.

3. The solid-liquid separator system according to claim 1, wherein
   the activated carbon adder is configured to add activated carbon to at least one of an intake well adapted to store therein raw water taken from a water source and a reservoir well adapted to store therein raw water before the flocculating sedimentation, and
   the inflow line is configured to supply raw water containing activated carbon from the reservoir well to the liquid cyclone.

4. The solid-liquid separator system according to claim 1, wherein
   the activated carbon adder is connected with the activated carbon discharge pipe, supplied with activated carbon discharged from the liquid cyclone, and adapted to recycle supplied activated carbon.

5. The solid-liquid separator system according to claim 1, further comprising:
   an activated carbon regenerator connected with the activated carbon discharge pipe, adapted to regenerate an adsorption capacity of activated carbon discharged from the liquid cyclone, and configured to supply the activated carbon adder with activated carbon with a regenerated adsorption capacity.

6. The solid-liquid separator system according to claim 1, further comprising:
   a sensor adapted to measure at least one of a water quality of raw water to be supplied to the liquid cyclone and a water quality of pretreated water discharged from the liquid cyclone; and
   the activated carbon adder being adapted to adjust a quantity of activated carbon to be added in accordance with a measurement result of the sensor.

7. The solid-liquid separator system according to claim 1, further comprising:
   a first sensor adapted to measure a water quality of raw water running to flow into the liquid cyclone;
   a second sensor adapted to measure a water quality of pretreated water being discharged from the liquid cyclone; and
   the activated carbon adder being adapted to adjust a quantity of activated carbon to be added in accordance with a difference between a measurement result of the first sensor and a measurement result of the second sensor.

* * * * *